United States Patent
Ellis et al.

(10) Patent No.: US 7,512,751 B2
(45) Date of Patent: Mar. 31, 2009

(54) METHOD AND APPARATUS FOR ADJUSTING TIMING SIGNAL BETWEEN MEDIA CONTROLLER AND STORAGE MEDIA

(75) Inventors: Robert W. Ellis, Phoenix, AZ (US); Kevin L. Kilzer, Chandler, AR (US); Daniel P. Fogelson, Chandler, AZ (US); Alan A. Fitzgerald, Gilbert, AZ (US)

(73) Assignee: Adtron Corporation, Phoenix, AZ (US)

( * ) Notice: Subject to any disclaimer, the term of this patent is extended or adjusted under 35 U.S.C. 154(b) by 708 days.

(21) Appl. No.: 11/043,709

(22) Filed: Jan. 26, 2005

(65) Prior Publication Data
US 2005/0132040 A1 Jun. 16, 2005

Related U.S. Application Data

(62) Division of application No. 10/217,167, filed on Aug. 12, 2002, now abandoned.

(60) Provisional application No. 60/379,035, filed on May 8, 2002.

(51) Int. Cl.
*G06F 12/00* (2006.01)
(52) U.S. Cl. ......................... 711/154; 710/23
(58) Field of Classification Search ................ 711/170, 711/112, 114, 154, 156; 710/5, 22, 23; 709/224, 709/225
See application file for complete search history.

(56) References Cited

U.S. PATENT DOCUMENTS 5,509,138 A * 4/1996 Cash et al. ................. 711/170

| | | | |
|---|---|---|---|
| 5,687,389 A * | 11/1997 | Packer | 710/5 |
| 6,098,114 A | 8/2000 | McDonald et al. | 710/5 |
| 6,134,630 A | 10/2000 | McDonald et al. | 711/114 |
| 6,138,176 A | 10/2000 | McDonald et al. | 710/6 |
| 6,199,150 B1 * | 3/2001 | Yoshikawa | 711/170 |

(Continued)

OTHER PUBLICATIONS

Franck Chu, "Serial ATA—Next Generation Storage Interface", White paper, Hitach Global Storage Technologies, 2007.*
Serial ATA Host Controller Solutions 88SX6041/88SX6081, White paper, Hitach Global Technologies, 2003.*

*Primary Examiner*—Pierre-Michel Bataille
(74) *Attorney, Agent, or Firm*—Cahill, von Hellens & Glazer, PLC

(57) ABSTRACT

A storage system controller (302) includes a plurality of media controllers (301), a local microprocessor (306), and a host interface logic (310), operably coupled by a multi-drop parallel bus. The multi-drop parallel bus includes a control bus (324), a payload data bus (320), a real-time ready-status (data ready) signaling bus (322) and a general microprocessor bus (330). Each media controller has a storage media (311) operably coupled thereto. Each media controller includes a parameter storage (404), a media interface circuit (406), a control data state machine (408), a command sequencer state machine (410), a media-side multi-mode transfer state machine (412), a dual-port memory (402), a memory controller (420), and a host-side transfer state machine (430). The host interface logic and the media controllers are implemented in one or more Field Programmable Gate Arrays. The storage system architecture allows the microprocessor to simultaneously broadcast a command to the media controllers, which have a capability to substantially simultaneously begin exchanging data with the storage media in response to the command. The storage system has provision for Redundant Array of Independent Disks, method 0, operation.

1 Claim, 4 Drawing Sheets

U.S. PATENT DOCUMENTS

| | | | |
|---|---|---|---|
| 6,289,398 B1 | 9/2001 | Stallmo et al. | 710/5 |
| 6,301,625 B1 | 10/2001 | McDonald et al. | 710/5 |
| 6,381,674 B2 | 4/2002 | DeKoning et al. | 711/113 |
| 6,385,683 B1 | 5/2002 | DeKoning et al. | 710/261 |
| 6,842,864 B1 * | 1/2005 | Barth et al. | 711/170 |
| 7,308,524 B2 * | 12/2007 | Grundy et al. | 711/103 |

* cited by examiner

METHOD AND APPARATUS FOR ADJUSTING TIMING SIGNAL BETWEEN MEDIA CONTROLLER AND STORAGE MEDIA

CROSS-REFERENCE TO RELATED APPLICATIONS

The present application is a division of and claims priority to an application entitled "METHOD AND APPARATUS FOR ADJUSTING TIMING SIGNAL BETWEEN MEDIA CONTROLLER AND STORAGE MEDIA", filed Aug. 12, 2002, and assigned Ser. No. 10/217,167 now abandoned, which application is related to and claims priority of a provisional application entitled "PROCESS T", filed May 8, 2002, and assigned Ser. No. 60/379,035, which application is assigned to the present assignee.

BACKGROUND OF THE INVENTION

1. Field of the Invention

This invention relates in general to computer storage media, and more particularly to an architecture for interconnecting an array of storage media and a method for controlling the storage media.

2. Description of the Related Art

Modern computers usually consist of one or more central processing units (CPUs) with local high-speed memory connected to input and output devices, network interfaces, and also to mass storage devices, or storage media, for long-term storage of programs and information. The CPU and storage media are connected using a host adapter, and control information and stored (or retrieved) data share a common data path. The CPU is solely responsible for sending control information, but data transfer can be handled by the CPU or by a direct memory access (DMA) controller. The DMA controller of a known prior art storage system must disadvantageously share high-speed memory with the CPU. The DMA controller and the CPU contend for access to the high-speed system memory, and, disadvantageously, each slows the other. Thus, what is needed is a mechanism that reduces the need to share the memory, which will result in higher overall throughput.

When a prior art computer system has more than one storage media that operate simultaneously and in parallel, the CPU must send control information to each separately and sequentially. In other words, the CPU sends control information to each storage media one at a time, and each of these control activities wastes some amount of time. Likewise, the data from each storage media is transferred into high-speed memory separately and sequentially, with each storage media performing its transfer while all others wait their turn to share a data bus.

Storage media do not always operate independently. Multiple storage media are placed into arrangements that enhance the storage system's data storage capacity, data transfer speed, data integrity, or some combination of these. One known method is by striping, i.e., spreading the data across more than one storage media. The RAID 0 (redundant array of independent disks, method 0) configuration can increase both capacity and transfer speed by striping data across a plurality of hard disks, and passing small portions of the data to each storage media in the array. All RAID configurations require two or more storage media and a controller for each storage media. The total storage capacity of the array is equal to the sum of the storage capacities of the individual storage media. Theoretically, the combined data transfer rate approaches the sum of the individual data transfer rates.

Most storage media in use today are based on the Small Computer System Interface (SCSI) or the Advanced Technology bus Attachment (ATA) standards. The two standards are similar in that they both combine control and data signals into the same physical signals, but differ in the electrical details and protocols used to connect the storage media to the CPU. Both require the use of a host-bus adapter to allow the CPU to communicate with the storage media. A major difference between the two standards is that the ATA standard allows only one or two storage media to be connected to a single host adapter, while the SCSI standard allows up to sixteen storage media to be connected. The ATA interface hardware is quite simple when compared to the SCSI interface hardware. The consumer PC industry has adopted the ATA storage media as the standard storage media for most systems. The most common host adapter is based on the Intel 800-series chipset controller that has been incorporated into storage media, and is currently a standard subsystem in the Intel Southbridge architecture. The Intel 800-series chipset interface allows the CPU to pass control information to the ATA storage media and adjust the timing of interface signals to give optimum performance. Data transfers may be performed by the CPU explicitly or by the system DMA controller, moving data between the storage media and the system high-speed memory. A limitation of this interface is that in many systems only two 800-series ATA host adapter interfaces may exist in the system together, and this limits the ability to create large RAID storage systems. The SCSI interface does not share this restriction, and so most RAID storage systems are created using SCSI interfaces, requiring a PC owner to add a SCSI host adapter alongside the ATA host adapters.

The physical medium used to store data within all SCSI and ATA storage media is divided into logical blocks, each of which can hold 512 bytes of data (4096 bits), and each logical block is given a specific logical block address (LBA). When data is transferred to or from the storage media, the LBA of the block is specified as part of the control information, and only whole blocks can be transferred. When arranged in a RAID 0 configuration, the entire array is addressed using a "host" LBA (hLBA), and the RAID subsystem is responsible for addressing a corresponding "media" LBA (mLBA) in each of the arrayed storage media. In those RAID systems where the host computer is directly responsible for addressing the individual storage media, the method and process of associating hLBA with mLBA is contained in the RAID-subsystem device driver (a part of the operating system). RAID subsystem drivers are now included as standard components in many popular operating systems. Disadvantageously, these RAID subsystems require a large number of host adapter connections to achieve the desired performance, and activation of the feature is often a complicated procedure. Alternative RAID implementations add a coprocessor to the host computer, so that the host device driver communicates with only one device directly (the coprocessor), and the coprocessor then commands the various media. In the latter case, the host must have a device driver specifically designed for communicating with the coprocessor, and cannot use the standard storage media device driver.

FIG. 1 illustrates a typical prior art RAID array 100 that employs a coprocessor. The RAID array 100 is designed to accelerate the transfer of data between the various storage media 102 and the memory 104 of a host, or computer system 106. The prior art RAID array 100 has two disadvantages: first, an automated array coprocessor 108 is required to be connected to the PCI bus 110 of the computer system 106, and second, a host storage media driver 112 must be replaced with a specially designed driver. These two disadvantages limit application of the prior art RAID array 100 to those computer systems 106 for which versions of the automated array coprocessor 108 and storage media driver 112 have been implemented. Not all computer systems 106 have the luxury of replacing an existing storage media driver 112. Owners of legacy computer systems already in service are often reluctant to modify the computer system software in any way, often because the qualification process for the computer system is arduous. Medical computer systems and other computer systems with life-and-death reliability requirements undergo both design reviews and reliability demonstrations that are extremely expensive to repeat when an entire computer system must be tested. In other cases, the knowledge and support tools required to modify the software of some older computer systems have been lost in antiquity and it would be impossible to add a new storage media driver regardless of the testing requirements. Thus, what is needed is an apparatus and method without those restrictions in order to allow the storage media to communicate with any type of host interface, and to respond to all host commands in a way that is appropriate and effective.

The RAID array 100 transfers data from each storage media 102 whenever any storage media is ready to transfer and the packet-switched bus 114 is not being used by another storage media. The RAID array 100 employs a single, large, memory buffer 116 that is used to reconstruct the order in which the computer system 106 expects to receive the data. This requires a complex automated array coprocessor 108. Thus, what is needed is a method and apparatus to transfer data on a common payload bus in an order expected by the host computer, thereby eliminating the requirement for the automated array coprocessor.

Prior art storage systems disadvantageously require a micro-controller and an automated array coprocessor to track the data request and the packets, and the storage system is required to re-collect the data when the storage media have completed transferring data. Prior art storage systems disadvantageously require a completion code that the automated array coprocessor must pass back to the micro-controller. Accordingly, there exists a need for overcoming the disadvantages of the prior art as discussed above, including a mechanism that reduces the need to share the memory, which will result in higher overall throughput.

SUMMARY OF THE INVENTION

The present invention provides a storage system that includes a local microprocessor, a plurality of media controllers that are all operably coupled to the local microprocessor, and a storage media that is operably coupled to each media controller, and in which more than one media controller start to substantially simultaneously exchange data with the storage media to which it is operably coupled, in response to a command from the local microprocessor.

The present invention also provides a storage system controller for controlling at least one storage media, and which the storage media controller includes: a local microprocessor; and a plurality of media controllers operably coupled to the local microprocessor via a multi-drop bus, and in which the local microprocessor sends simultaneously one command to the plurality of media controllers to cause more than one media controller to substantially simultaneously start to exchange data with a storage media to which it is operably coupled.

The present invention also provides a storage system controller that includes: a host interface logic; and a local microprocessor and a plurality of media controllers, which are all operably coupled to the host interface logic via a multi-drop bus.

The present invention also provides in a storage system that has a plurality of media controllers that are operably coupled to a multi-drop bus, and in which each media controller is pre-assigned a physical controller number, a method, that includes the steps of: providing each media controller with a next physical controller number; causing one media controller of the plurality of media controllers to transfer data via the multi-drop bus; causing the one media controller to announce on the multi-drop bus the next physical controller number; and causing another media controller of the plurality of media controllers to transfer data via the multi-drop bus, wherein the pre-assigned physical controller number of another media controller has a same value as the next physical controller number.

The present invention also provides in a storage system, a method of adjusting signal timing of a media controller and a storage media for a data transfer therebetween according to parameters stored in the storage media, which includes the steps of: applying power to the data storage system; interrogating the storage media to obtain timing information; and configuring the media controller to a fastest available speed setting for the storage media.

The present invention also provides a storage system controller that includes: a local microprocessor and a plurality of media controllers, all operably coupled to the local microprocessor via a multi-drop bus, and in which each media controller further includes: a media interface circuit; a media-side multi-mode transfer state machine operably coupled to the media interface circuit; and a dual-port memory operably coupled to the media-side multi-mode transfer state machine and to the media interface circuit.

The present invention also provides a media controller for controlling a storage media that has media interface protocol parameters stored therein, and in which the media controller includes: a command sequencer state machine; and a control data state machine operably coupled to the command sequencer state machine, for receiving the media interface protocol parameters from the storage media.

The present invention also provides a storage system controller that includes: a plurality of media controllers, all operably coupled via a multi-drop bus, and in which each media controller further includes: a media-side multi-mode transfer state machine for providing timing and sequencing of transfer of data by the plurality of media controllers; and a command sequencer state machine operably coupled to the media-side multi-mode state machine, for performing timing and sequencing of transfer of commands by the plurality of media controllers.

The present invention also provides a storage system controller for controlling transfer of data between a host computer and a plurality of storage media, which includes: a local microprocessor; and a plurality of media controllers, all operably coupled via a multi-drop bus, each media controller of the plurality of the media controllers including a parameter storage for storing a parameter, and in which, depending upon a value of the parameter, the storage system controller transfers data directly between one storage media and another storage media without transferring the data to the host computer.

The present invention also provides in a storage system, a method of determining a maximum access rate between a media controller and a storage media for a data transfer therebetween, which includes the steps of: a) transferring test data from the media controller to the storage media at a transfer rate; b) transferring the test data from the storage media to the media controller at the transfer rate; c) increasing the transfer rate; d) comparing the test data transferred in step a) with the test data transferred in step b), and repeating steps a), b) and c) until the test data transferred in step a) is not the test data transferred in step b); and e) configuring the media controller to a fastest access rate setting for the storage media, the fastest access rate being proportional to the fastest transfer rate for which the test data transferred in step a) is identical to the test data transferred in step b).

Other aspects, features, and advantages of the present invention will become apparent, to those skilled in the art, from the following detailed description and the accompanying drawings. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

The present invention will be described with greater specificity and clarity with reference to the following drawings, in which.

DESCRIPTION OF THE PREFERRED EMBODIMENTS

The embodiments discussed below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Figure 2:
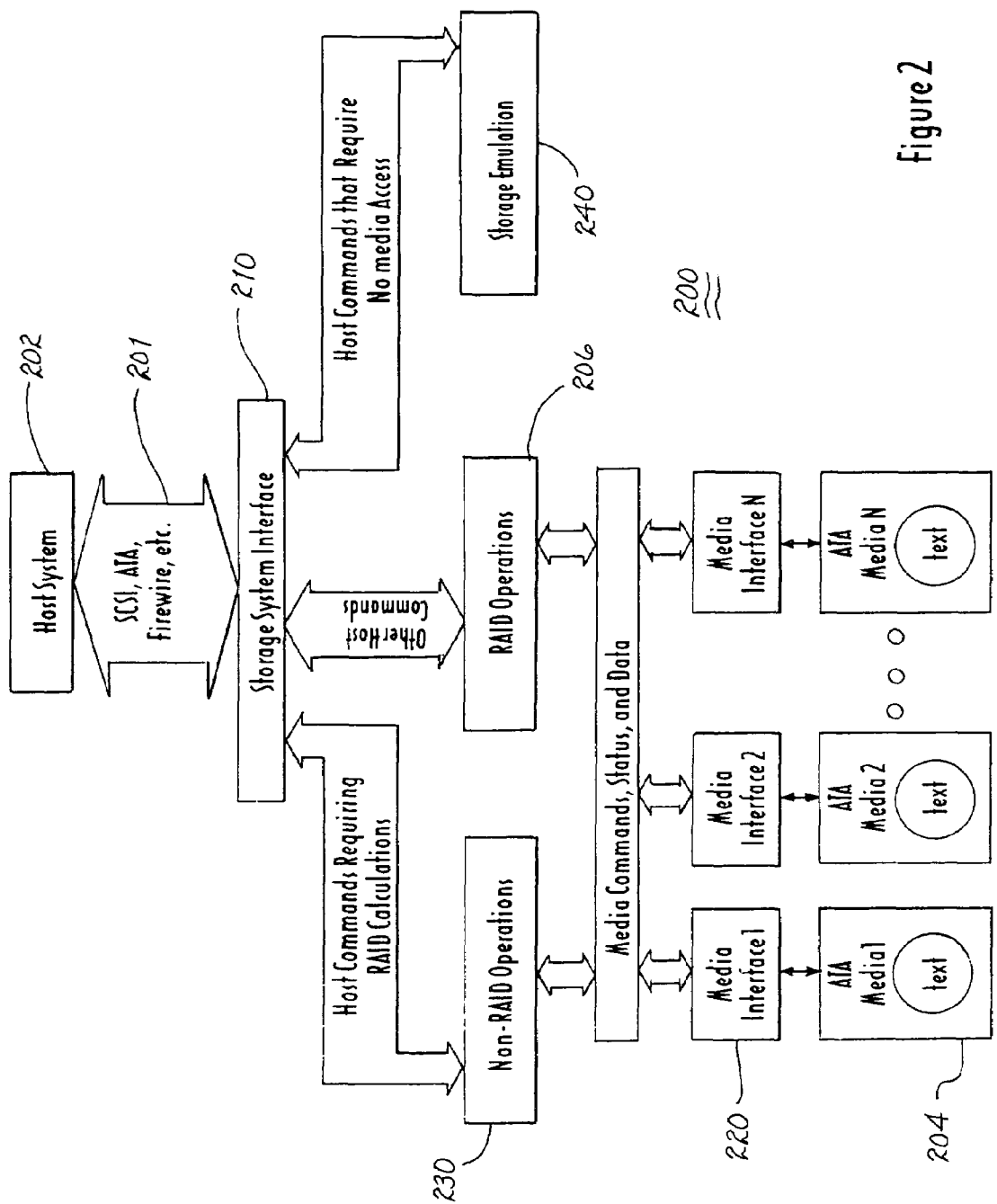
FIG. 2 is a block diagram of an emulation model of a RAID storage system in accordance with the invention.

FIG. 2 is a high-level process representation of a storage system 200 in accordance with the invention showing a general flow of control information. The flow of data is not shown. By far the most commonly used path is that through RAID Operations 206, because it is required for all READ and WRITE operations. A host/application interface (not shown) represents the highest level in a host computer 202 that uses the concept of LBA when accessing the storage system; higher levels use the concept of "files" which are constructed using LBAs. The storage system interface 210 is either a lower layer in the operating system, or the literal ATA or SCSI interface. If RAID is implemented within the host storage media drivers, the storage system interface 210 is the upper-most layer of that subsystem. At the storage system interface 210, the storage request is identified as "RAID-able" or "non-RAID-able".

The invention does not require a specific host interface 201. Suitable interfaces are PCI (as was used in the prior art), ATA, SCSI, FireWire®, Fiber Channel, Ethernet®, Infinifland™ or any other high-speed data transfer channel. Commands received in one of the protocols for the aforementioned interfaces can be fulfilled using storage media 204 requiring a different protocol. Even though the protocols include commands that allow similar functions, the commands are, in general, different. The preferred embodiment of the invention assumes that the storage media 204 are ATA storage media, and it is not always possible to format an ATA command that corresponds to a command received on a non-ATA bus. Based on command function, the commands fall into three broad categories, each of which is discussed hereinbelow.

The "RAID-able" commands are those that are subject to RAID calculations. Generally, this is any command that results in a data transfer operation. Other commands are those that deal with identifying the storage media manufacturer, model, storage capacity, and capabilities, and commands that cover security and storage media health. Not all these latter commands result in accesses to the storage media 204, and for those that do, the command parameters usually are not often altered according to the RAID formula. The method used to separate RAID and non-RAID operations must be executed in a timely manner.

The three individual paths from the storage system interface 210 represent that for any given host command, only one of the three options can be executed. All commands fall into one of the three categories. The RAID-able commands are subjected to the RAID calculations, and appropriate values for count and LBA are passed to the storage media 204 via the media interfaces 220. Some non-RAID-able commands access the storage media, and those commands are represented in FIG. 2 as Non-RAID Operations 230. The remaining commands, those that do not communicate with the storage media, are represented in FIG. 2 as Storage Emulation 240.

These command-handling mechanisms can also be used to intentionally warp the behavior of a command to better fit a specific application. For example, there is command which, using an older disk drive, requires about two seconds to complete, during which period a panel light is illuminated. A new version of the disk drive requires only a fraction of that time, and people are possibly confused because the light gives only a brief flash. The invention allows firmware of the storage system 200 to be modified so that the command requires two seconds to complete, and so that the operation returns to "normal" as perceived by a user. Often, older host computers include outdated versions of a protocol, if not outright protocol errors. The firmware of the storage system in accordance with the invention is customizable to work with or around these issues and errors, and to complete a command in a manner expected by a host computer.

The storage system 200 receives commands from the host computer 202. The actual interface (SCSI, ATA, FireWire, etc.) affects the storage system 200 only to the extent that the command processors must be tuned to the host protocol. Each command must be addressed individually, although, as mentioned hereinbefore, there are three broad categories of command handling mechanisms.

Some commands can be passed to the storage media 204 materially unchanged, using the parameters supplied by the host. This category is typified by the power-control operations. Most modern storage media 204 have a provision for automatically entering a mode of reduced power consumption, usually based on explicit requests from the host 202 or a timer that expires some seconds after the last host access. The host command used to change the power mode of the storage media 204 is similar in all the protocols, and is readily translated from one protocol to another. Likewise, the command for setting the duration of the timer is easily translated to different protocols.

There are some commands that are logically expected to allow a direct translation, but the storage media 204 does not provide a required feature, or implements the command in a different way. In this case, the storage system 200 issues a sequence of commands to the storage media(s) 204 in order to fulfill the purpose of the host request. An example of this command is the FORMAT operation, in which the SCSI FORMAT requests implies a formatting of the entire storage media, but the ATA FORMAT request specifies only a subset of the storage media. Using knowledge of the actual size of the storage media, the storage system 200 issues multiple ATA FORMAT commands to affect a formatting of the entire storage media 204.

Some commands are similar in any protocol, but because the storage system 200 in accordance with the invention implements RAID operations without the explicit knowledge of the host computer, the command parameters are advantageously translated so that each storage media 204 receives commands appropriate for its place in the RAID array. For example, a host request for the second logical block in the array is passed to the second storage media 204 (for its first logical block), but not to any other storage media 204. If the host request is for three logical blocks, the request is passed to three storage media 204, one block for each storage media. Most commands that transfer stored data fall into this last category.

Commands that have no realistic translation to the protocol of the storage media 204 are handled in such a way that the host computer is satisfied with the response. An example of this is the SCSI REQUEST SENSE command wherein the host requests details for a most-recent error reported by the storage media. An ATA storage media 204 will report the error details at the end of the erroneous command, and does not require that an additional command be issued. Instead, the storage system 200 records the error information at the time the erroneous ATA command completes, then when the host issues the REQUEST SENSE command, no storage media access is required (that is, no ATA command need be issued). Other examples are the MODE SENSE and SELECT commands, wherein the host retrieves and sets various operational parameters for the SCSI storage media. Most of the operational parameters involve the operation of the SCSI bus itself, and for these there is no ATA equivalent at any level.

Figure 3:
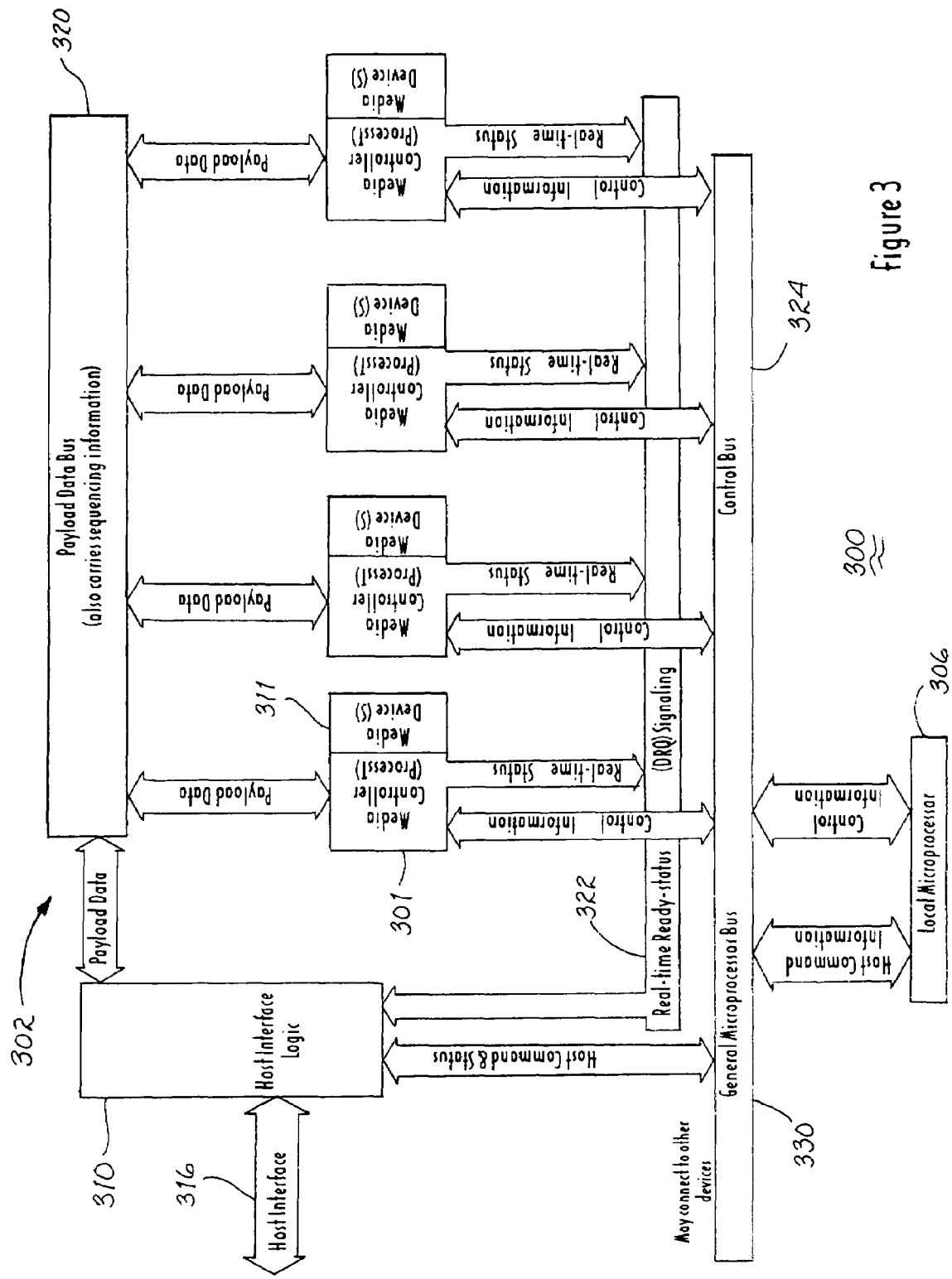
FIG. 3 is a simplified functional block diagram of a storage system in accordance with the invention.

A storage system 300 in accordance with the invention is shown in FIG. 3, and comprises a storage system controller 302 and at least one storage media 311. The storage system controller 302 comprises a plurality of media controllers 301; each media controller being operably coupled to a local microprocessor 306, to a host interface logic 310 and to the at least one storage media 311. The host interface logic 310 is operably coupled to a computer host, or host, via a host interface 316. Each media controller 301 is operably coupled to a payload data bus 320, to a real-time ready-status (data ready) signaling bus 322, and to a control bus 324. The local microprocessor 306 is operably coupled to a general microprocessor bus 330 and to the control bus 324. The general microprocessor bus 330 is optionally coupled to other devices. The host interface logic 310 is operably coupled also to the general microprocessor bus 330, to the payload data bus 320, and to the real-time ready-state (data ready) signaling bus 322.

The basic purpose of the storage system 300 is to provide Redundant Array of Independent Disks, method 0, operation (RAID 0) using INCITS T13 protocol-compliant (i.e., ATA) storage media such as rotating-magnetic disks or solid-state CompactFlash™. This operation is provided with no intervention from the host and no changes to existing host hardware or software, including, in particular, no changes to storage media drivers or to host adapters. In other words, the storage system 300 in accordance with the invention replaces a single ATA, SCSI or FireWire storage media with an array of storage media 311, and, in so doing, gains the benefits of RAID 0 (or higher) operation. Advantageously, the multiple-media storage system 300 in accordance with the invention appears to the host as a single ATA storage media, a single SCSI storage media or a single FireWire storage media. Another advantage of the invention is that an array of one type of storage media (ATA, for example) can appear as a single storage media of another type (SCSI, for example). A further advantage of the invention is that the array can comprise a mixture of types of storage media and nevertheless appear to the host as a single type. Furthermore, this single type can be different than any of the various types of storage media that comprise the array. Prior art storage systems assume that a host can be reprogrammed by installing a specific storage media driver in place of the storage media driver of the host, or by connecting to hardware assumed to be present on the host motherboard. The storage system 300 in accordance with the invention avoids the necessity of writing storage media drivers and the problem of re-writing storage media drivers each time a revised operating system is installed in the host.

The media controllers 301 pass data to and from the host interface logic 310 via the payload data bus 320. FIG. 3 shows the top-level architecture of the storage system 300 with four media controllers 301 and four storage media, for convenience of illustration; a greater or fewer number can be used. In typical operation, more than one media controller 301 are used to provide RAID 0 (or higher) operation. The minimum configuration is one media controller 301 used alone to make a normally fixed storage media, such as an ATA drive, appear to the host as a removable storage media, such as a hot-swappable ATA drive. The plurality of media controllers 301 are implemented in one or more (depending upon the number of media controllers) FPGAs separately from the host interface logic 310, and the single host interface logic is implemented in another FPGA, for an ATA interface. The host is any computing system, such as a desktop PC, an embedded computer or an electronic appliance, with a standard storage system (e.g., single disk drive) host bus adapter. The host makes READ, WRITE, CONFIGURE, and IDENTIFY requests to the storage system 300 through a host adapter as would be done for any standard ATA storage media 311. Storage systems 300 with other number of storage media would operate in the same way using the same single local microprocessor 306 shown in FIG. 3.

The local microprocessor 306 provides the configuration and control information necessary to allow the storage system 300 in accordance with the invention to operate separately from the host itself. Preferably, each media controller 301 is connected to one ATA storage media. However, each media controller 301 contains logic for addressing more than one storage media 311 on the same bus. The logic provides signals beyond the ATA specification that allow any number of storage media 311 to be addressed independently. Alternatively, the media controller 301 is connected to more than one ATA storage media 311.

The local microprocessor 306 functions as a system administrator and configures the media controllers 301. The local microprocessor 306, through each media controller 301, ascertains the capacity and characteristics of the storage media 311, and verifies that the various storage media are compatible with each other. The local microprocessor 306 then configures the media controllers 301 so that the RAID 0 operation can be performed. This configuration is statically determined (that is, factory configured); alternatively, it is dynamically determined when system power is applied and the available storage media are counted. Media controllers 301 handle the routine data-transfer commands, and the local microprocessor 306 handles other commands. Most (if not all), storage system 300 protocols include commands that allow the host to obtain identification and configuration information related to the storage system. The local microprocessor 306, programmed in accordance with the invention, handles those requests.

The storage system 300 in accordance with the invention increases the data transfer speeds over prior art storage systems having more than one storage media. When reading from a storage media 311, the hardware architecture in accordance with the invention separates mixed control and data signals on a bus of the storage media into separate buses, and when writing to a storage media, combines separate control and data signals onto the bus of the storage media. Advantageously, the hardware architecture does not require an external controller (i.e., the host) to perform detailed control sequencing, and the hardware architecture automates the data transfer task. The hardware architecture eliminates a need for the CPU of a host to perform the data transfers, and, as a result, Programmed Input/Output (PIO) style data transfers are advantageously completed in a single cycle and in contiguous operations. The media controller 301 performs READ and WRITE operations between both the host interface logic 310 and the storage media 311 in a single cycle.

The architecture includes a plurality of independent state machines in each media controller 301 that control both the storage media and a fully dual-ported RAM, which allows the data transfers with the host at a much faster speed than the speed of data transfers with the storage media 311, and allows such transfers to occur concurrently. The hardware architecture of the storage media has provision for a plurality of media controllers 301 to be connected in a parallel multi-drop environment, which advantageously allows commanding and operation of the storage media in true parallel. The plurality of media controllers 301 transfer to or from the storage media concurrently, and the state machines communicate with each other so that the data is presented to the host in the correct sequence, providing RAID 0 operation (multiple storage media appearing as a single storage media). The plurality of media controllers 301 transfer data to the multi-drop parallel payload data bus 320 in an order expected by the host computer, thus advantageously eliminating the use of a complex automated array coprocessor and the use of a single, large memory buffer.

In the preferred embodiment of the invention, the plurality of independent state machines are made from one or more FPGAs, which makes the storage system 300 in accordance with the invention easily scalable. Preferably, a Spartan® or Virtex® series FPGA, manufactured by Xilinx Corporation, is used. Alternatively, another type of FPGA is used. As a further alternative, the plurality of independent state machines are made from one or more application-specific integrated circuits (ASICs).

The host interface 316 may take any of several forms including ATA, SCSI, FC, or Ethernet. The ATA interface, the SCSI interface, the FC interface, and the iSCSI interface take host requests using a standard bus and protocol, and inherently provide RAID 0 (or higher) operation of the storage media 311 connected to the media controllers 301. This relieves the host of actually providing 1) multiple storage media interfaces 401, and 2) the storage media drivers required to give the functionality provided by the media controllers 301. Thus, the invention allows even simple computer systems to gain the advantages of RAID 0 (or higher) with little or no changes to existing implementations.

Existing solid-state ATA storage media have a capacity that is much lower than that of rotating disk drives, but with much greater durability. The media controllers 301, combined as RAID 0, can present a much higher capacity than any individual storage media, and allows such existing solid-state ATA storage media to be integrated into applications requiring higher storage capacities. The storage system 300 in accordance with the invention allows this to be accomplished with little or no change to the existing host implementation.

Many computer systems, especially low-cost computer systems, use an ATA interface when a high-capacity storage media is required. Conventional personal computers include two ATA interfaces. An ATA storage media (INCITS T13, or IDE) operates with a host interface protocol using a register set known as a "task file". With the task file supported in hardware, the local microprocessor 306 in accordance with the invention emulates the operation of the ATA storage media and passes the host requests to the media controllers 301. More advanced systems often use the SCSI interface (INCITS T10), or the more recent FC interface (INCITS T11). In this case, the host interface 316 is more complicated, and the requirements of the local microprocessor 306 are more involved. The complexity of the SCSI, FC and FireWire interfaces warrants the use of standard, off-the-shelf, SCSI interface chips for the host interface logic 310, and the data-only side of the media controller 301 is used for the DMA interface of those chips. Examples of interface chips are the QLogic FAS466 (SCSI) and FiberFAS440 (Fiber Channel). As SCSI commands arrive from the host, the commands are interpreted by the local microprocessor 306 and the media controllers 301 are commanded. The data transfer then takes place with little or no intervention from the local microprocessor 306. With no changes to the host operation or to the host interface 316, the advantages of the invention are obtained. The iSCSI standard provides the command functions of SCSI using an Ethernet network interface, and allows the RAID 0 capabilities of the media controllers 301 to be applied to the lower-capacity solid-state Flash storage media, thereby producing a higher-capacity, very rugged, array with little or no changes to conventional (i.e., single storage media) iSCSI implementations. The local microprocessor 306 handles the iSCSI requirements for secure operation on a local or wide area network (LAN or WAN). For SCSI, FC or FireWire interfaces, the media controllers 301 are implemented in one or more (depending upon the number of media controllers) FPGAs separately from the host interface logic 310, and the single host interface logic is implemented in off-the-shelf interface chips.

The media controller 301 in accordance with the invention automatically handles status operations. Status operations cause most of the interrupt activity in the prior art architecture. Unlike prior art storage systems, use of media controllers 301 in accordance with the invention means that data transfer rates are not determined by the speed of a prior art micro-controller or the bandwidth of the prior art micro-controller's memory. Advantageously, use of the media controller 301 in accordance with the invention eliminates the interrupt overhead present in prior art micro-controller implementations.

Each media controller 301 simultaneously receives control sequences from the local microprocessor 306, and then each media controller 301 performs autonomous parallel operations. Prior art storage systems disadvantageously command each storage media one at a time. The time required commanding the storage media 311 in the storage system 300 in accordance with the invention is reduced over the prior art because all the storage media are often commanded simultaneously. In the storage system 300 in accordance with the invention, the time required to write the command information to the storage media 311 is advantageously further reduced through the use of a state machine instead of a conventional micro-controller. Some prior art implementations, such as the RAID systems in Linux® and Microsoft Windows®, disadvantageously rely on the host CPU for the command operations of each individual storage media, but by deploying one media controller 301 for each storage media 311 and then arranging that the host command is distributable to all media controllers as one media controller, true simultaneous operation is realized with the storage system 300 in accordance with the invention.

Figure 4:
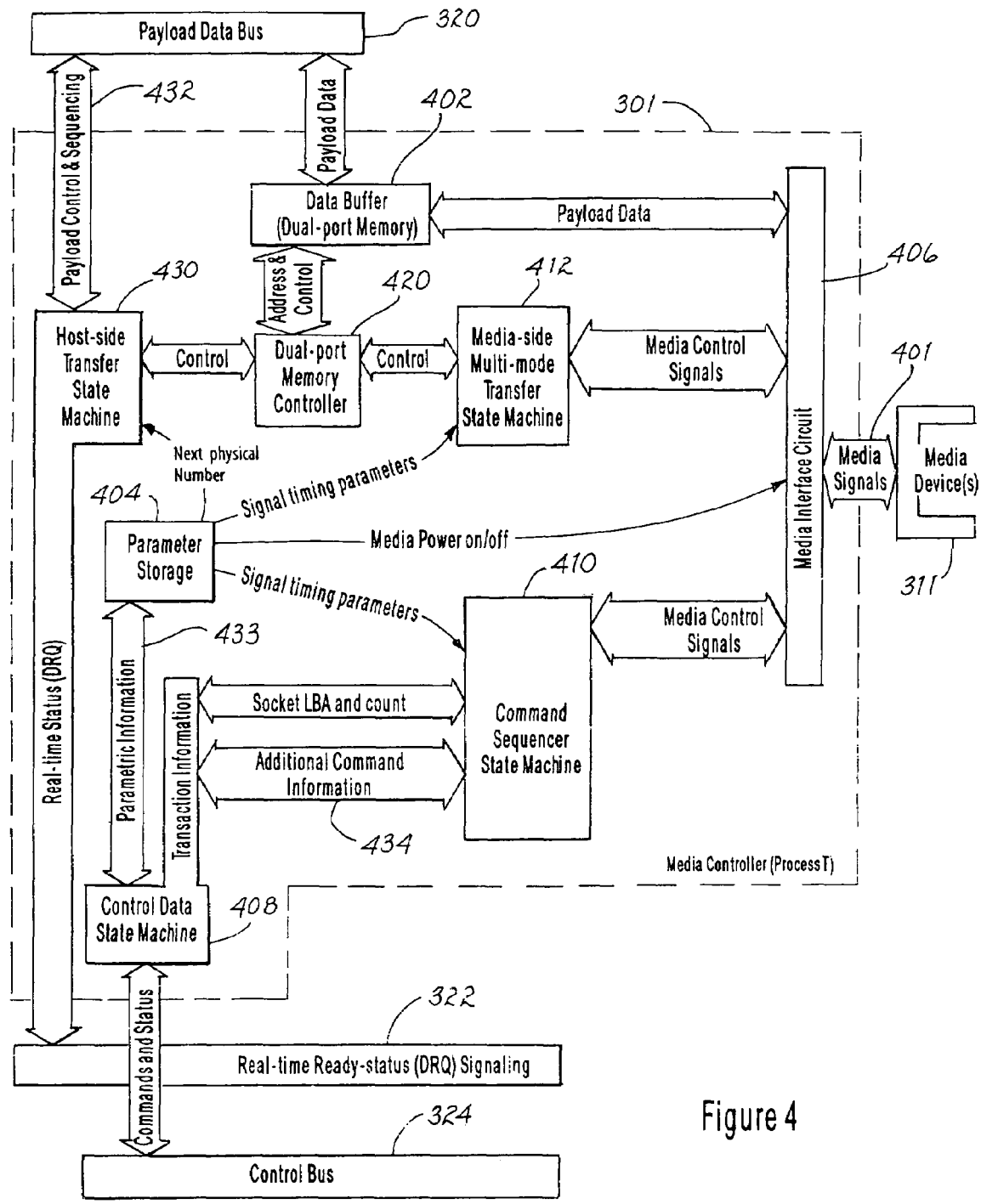
FIG. 4 is a simplified functional block diagram of a media controller in accordance with the invention.

The media controllers 301 are advantageously capable of performing autonomous storage media 311 to storage media 311 operation or single media operation such as formatting, without any further intervention of the local microprocessor 306 after the local microprocessor initiates the operation. Storage media 311 to storage media 311 operation occurs, for example, during initialization of a RAID 1 mirror pair. Referring now to FIG. 4, to initiate storage media to storage media operation, the local microprocessor 306 changes the value of the "storage media to storage media" parameter stored in parameter storage 404. This change in value affects the operations of the control data state machine 408 and the host-side transfer state machine 430 so that a media controller 301 receives data from another media controller 301 via the payload data bus 320.

Referring again to FIG. 3, in the preferred embodiment of the invention, a plurality of media controllers 301 are combined with an ATA interface to give RAID 0 performance. This is accomplished using one media controller 301 for each storage media 311, and by sending multiple control sequences to the various storage media 311 at the same time. The ATA interface at host interface 316 allows the host to issue conventional ATA commands to the local microprocessor 306. The host-requested logical block address (hLBA) and host-requested count (hC) values contained in the host command are processed by the local microprocessor 306 at the storage system 300 according to RAID calculation equations, and all available media controllers 301 are commanded: simultaneously when possible, sequentially when necessary. The calculation and commanding processes are optimized to add as little overhead as possible.

The storage system 300 in accordance with the invention relieves the host of the necessity to perform the RAID calculations and to command each individual storage media. This benefit is increased when it is realized that the host no longer need support multiple ATA storage media directly, allowing the RAID storage system 300 to be sized according to the application and not limited by the available ATA host adapters. The host needs to have only one ATA interface at host interface 316, and, through the use of the local microprocessor 306 and the media controllers 301, multiple ATA storage media are attached without a need to change the host configuration or storage media drivers. By relieving this burden from the host, the RAID storage system 300 in accordance with the invention may be advantageously extended to smaller, less expensive hosts, and to embedded computers that traditionally have few resources and little opportunity to add RAID storage media drivers.

There are four storage system buses 320, 322, 324 and 330 used in the storage system 300 in accordance with the invention. Alternatively, there are three storage system buses if the general microprocessor bus 330 and the control bus 324 are combined. The payload data bus 320, the control bus 324 and the real-time ready-status (data ready) signaling bus 322 are all used during a normal transaction. Advantageously, all media controllers 301 connect to these buses 320, 322 and 324 in the same way, making each a drop point on the multi-drop interface. Controllers of prior art storage systems do not connect to a prior art bus in the same way; rather, each prior art controller in a prior art storage system connects to the prior art bus in a different way. That is, each prior art controller disadvantageously uses a separate, individual chip-select line to distinguish one prior art controller from another.

After the control path processing has been separated from the data path, the data path is optimized for a higher possible transfer rate and for automatic shifting from one storage media to another for RAID 0. The data paths from two or more media controllers 301 are coordinated to give synchronized transfers and automatic data comparison for RAID 1, and generation or recovery of data for higher RAID modes. Alternatively, data buffers (FIFOs) and other mechanisms are employed in the data path to enhance the data transfer rate and to make optimizations for masking some deficiencies in standard storage media.

The control bus 324 is used during system initialization when the local microprocessor 306 reads capacity and configuration information from the storage media 311, and also during error processing when the local microprocessor 306 reads current status information from the storage media 311 and media controllers 301. In typical operation, the local microprocessor 306 accepts the host commands over the general host microprocessor bus 330, then relays the appropriate LBA and count values over the control bus 324 of the storage system 300 a few microseconds later. As a host transaction completes, the local microprocessor 306 passes control information to the host interface logic 310 so that the host receives the correct response: error or no error. If the local microprocessor 306 performs the RAID calculations, the LBA and count values passed to the media controllers 301 are the transformed values.

Each transaction between the local microprocessor 306 and storage media 311 is characterized by the block count and initial LBA values of the host (hC and hLBA). The transaction begins with the given hLBA, and transfers the requested number of contiguous blocks. The local microprocessor 306 calculates the appropriate block count (mC) and starting LBA (mLBA) values for each storage media 311 involved in the transaction. Some storage media 311 may transfer nothing. The appropriate combination of mC and mLBA is then passed to each media controller 301 via the control bus 324 of the storage system.

For any host data request that specifies hLBA and hC, a maximum of three mLBA/mC combinations are passed to the media controllers 301, regardless of the number of media controllers 301, the host starting LBA, or the host count. For many combinations of host LBA and count, only one combination of LBA/count is passed to all media controllers 301. By design, the control bus 324 allows all media controllers 301 to receive the LBA and count values simultaneously when possible, greatly reducing the amount of time required to command the media controllers 301. For example, when four controllers of a prior art storage system are in use, each controller would be disadvantageously commanded separately, requiring four command transfers on a bus. In the storage system 300 in accordance with the invention, all media controllers 301 that receive the same values are advantageously commanded simultaneously. The best case requires only one command transfer and the worst case requires three command transfers, an improvement in either case.

Figure 1:
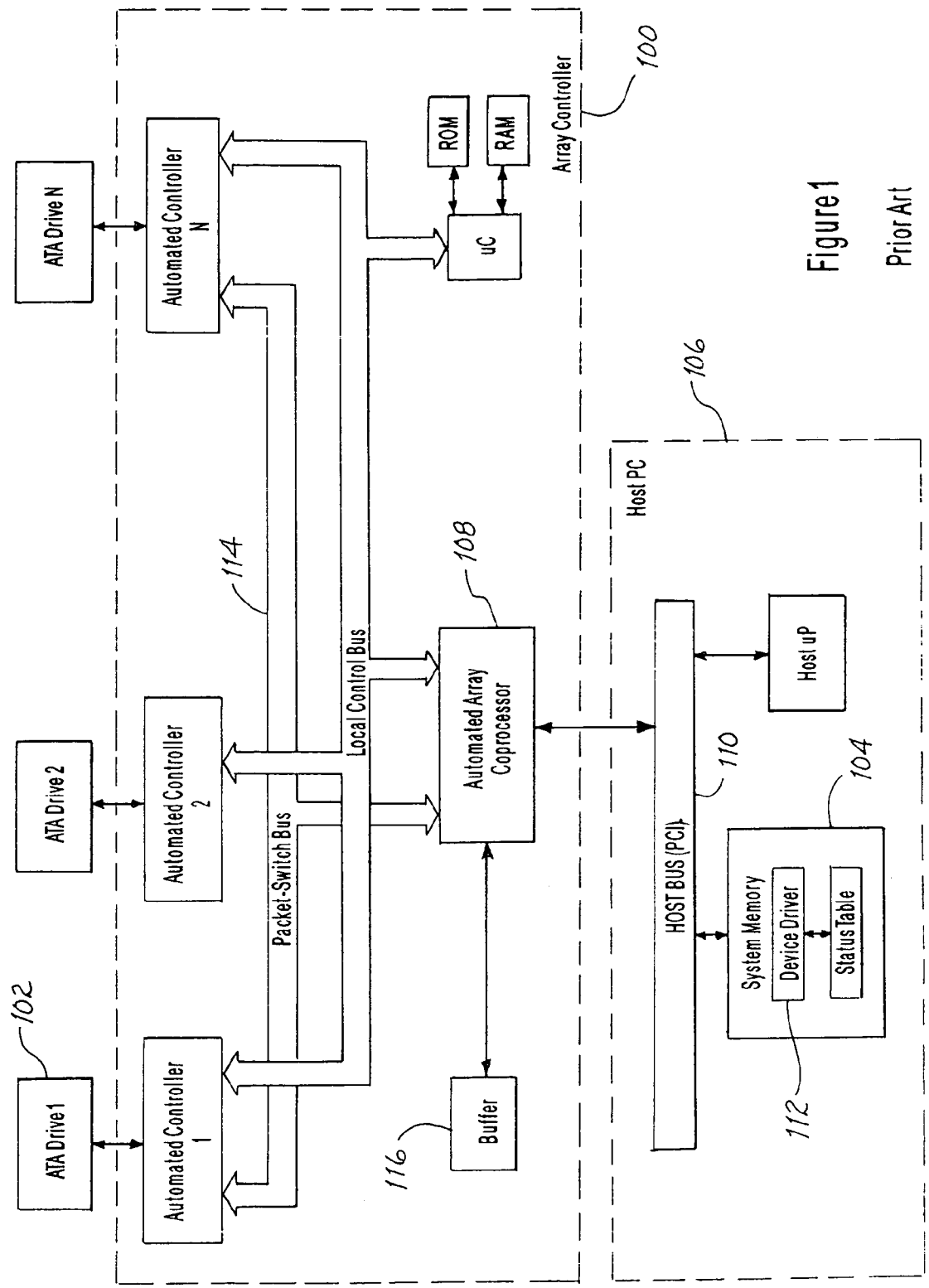
FIG. 1 is a block diagram of a prior art RAID architecture.

The payload data bus 320 carries sequencing information and also data for storage into the storage system 300 and for retrieval out of the storage system. This payload data bus 320 is optimized for data transfer speed and it can transfer many tens of megabytes per second. The media controllers 301 are optimized to increase the transfer rate across the payload data bus 320. The media controllers 301 are optimized, through use of a dual-port memory 402 (see FIG. 4) and by an ability to quickly obtain control of the payload data bus 320 from the other media controllers 301. The payload data bus 320 is separate from both the general microprocessor bus 330 and the control bus 324 of the storage system 300, allowing it to be optimized for extremely high speeds by the use of bus drivers and receivers that use low voltage differential (LVD) signaling techniques, or by the use of impedance-controlled, single-ended drivers and receivers. The payload data bus 320 is not limited to the bus width of the host or storage media (therefore it can be more or less than 16 bits wide) allowing it to be optimized separately from either the host interface 316 or the media interface 401, or from both. The use of the dual port memory 402 within each media controller 301 allows the storage system in accordance with the invention to advantageously have different data rates at the media interface 401 and at the host interface 316. The average data rate on the payload data bus 320 is no less than that with the prior art switched-packet bus 114 (see FIG. 1), because the bus rate is ultimately determined by the lesser of the transfer rates of the individual storage media 311 and the transfer rate of the host interface 316.

The real-time ready-status (data ready) signaling bus 322 is a simple, one-wire multidrop wire-OR'd bus that allows a media controller 301 to indicate that it is ready to transfer data. A media controller 301 accepting control of the payload bus may not yet be ready to transfer data even though a first media controller 301 has completed its transfer. In this case, it is usually desirable to alert the host interface 316 that nothing is available for the moment. Depending on the host interface type (ATA, SCSI, etc.), the host interface 316 may take action to release the host-interface bus (e.g., SCSI disconnect), or signal the host that nothing is available. A data request (data ready) signal indicates to the host interface 316 that one of the media controllers 301 is prepared to transfer payload data.

The host interface logic 310 separates control and data information from the host so that control information alone may be communicated to the media controllers 301 and storage media 311. The local microprocessor 306 processes non-RAID-able commands as would be expected with any conventional storage media. Requests to configure the host interface or return identify information are handled without accessing the storage media 311. When the local microprocessor 306 identifies RAID-able requests (reads and writes), the request is subdivided into component requests to one or more of the media controllers 301 and passed over the control bus 324. Because the control bus 324 is a multi-drop serial bus, any portion of the request that is duplicated for two or more media controllers 301 is advantageously sent to the two or more media controllers simultaneously by turning on the receive mode of the two or more media controllers. The invention allows all media controllers 301 of the storage system 300 to start substantially simultaneously.

Most communication between the media controllers 301 and the host interface logic 310 proceeds through the local microprocessor 306, except for operations performed via the payload data bus 320. The local microprocessor 306 fulfills requirements related to system initialization and exception processing. When power is first applied to the system, or if the host RESET signal is asserted, the host expects that certain conditions are established and/or that certain data will be available. Some of this data is obtained by interrogating the storage media 311 and ascertaining the total capacity of the system. The local microprocessor 306 includes a non-volatile memory (not shown) that contains the storage system 300 configuration, identify information (manufacturer, model, etc), timing information, and functional mode characteristics. After power is first applied or the system reset signal is asserted, the local microprocessor 306 interrogates the storage media 311 to obtain timing and functional mode information, then configures each media controller 301 to the fastest available speed setting for that storage media 311. The program of the local microprocessor includes the algorithms for dynamically adjusting the timer values at run time. Alternatively, the timing and functional mode information is pre-configured in the non-volatile memory of the local microprocessor 306.

The storage system 300 in accordance with the invention determines a maximum access rate between the media controller 301 and the storage media 311 for a data transfer therebetween, by performing the following steps: a) transferring test data from the media controller to the storage media at a transfer rate; b) transferring the test data from the storage media to the media controller at the transfer rate; c) increasing the transfer rate; and d) comparing the test data transferred in step a) with the test data transferred in step b). Then, steps a), b) and c) are repeated until the test data transferred in step a) is not the test data transferred in step b). Finally, the media controller 301 is configured to a fastest access rate setting for the storage media 311, the fastest access rate being proportional to the fastest transfer rate for which the test data transferred in step a) is identical to the test data transferred in step b).

As host system requests are received by the local microprocessor 306 and examined, the commands are identified as RAID-able, non-RAID-able, or emulated. The host interface logic 310 presents the host with a single consistent interface, and allows the combination of all the connected storage media 311 to appear as a single logical storage unit. This allows the storage system 300 to be comprised of dissimilar storage media 311 to take advantage of the best attributes of each storage media type, and allows for incremental improvements as the storage system industry develops new storage techniques and products. Furthermore, storage media characteristics such as model and serial numbers can be fixed constants, regardless of the model and serial numbers of the composite storage media. Likewise, a smaller-than-reality storage media capacity can be presented to the host, which is of special benefit for older computer systems that were not designed to handle the huge capacity of modern storage media, allowing those computer systems to be upgraded to modern storage media when the original storage media is no longer available.

When the host interface 316 and media interface 401 employ different command protocols, or when the protocols match, but the capabilities of the storage media are not the same as the capabilities of the host interface, the local microprocessor 306 translates the host command to an equivalent media command or sequence of media commands. For example, if the host interface 316 is SCSI and the media interface 401 is ATA, the protocols employ completely different command codes and a translation is required. Another example is when both host interface 316 and media interface 401 are ATA, in such case the host may issue a READ DMA command when the storage media do not support DMA, so a READ PIO operation would be issued to the storage media. In either case, a translation can be inserted by the local microprocessor 306 to yield the correct behavior and the best available performance.

The local microprocessor 306 is also used during error recovery. Error recovery involves retrieving error information from the storage media and/or the media controller 301, keeping a record of the error, attempting to repeat the operation with the storage media 311, notifying the host of the error, or some combination of these. When reporting errors involving a RAID 0 configuration, the media reports media-specific error locations that must be translated to host-view error locations. In other words, the RAID calculation must be performed in reverse to produce a host LBA value corresponding to the erroneous media LBA location. Reconfiguration of the storage system 300 and the transfer of known-good data to back-up storage media are more advanced uses of the local microprocessor 306 that are part of error recovery. The local microprocessor 306 uses its non-volatile memory for the purpose of logging events such as errors or other information. The data log can be retrieved at a later time for analysis and storage media use profiling. Preferably, the local microprocessor 306 is a 16-bit general-purpose microprocessor, preferably a Model Am186ER microprocessor of Advanced Micro Devices, Inc.; alternatively, it is another microprocessor. As a further alternative, the local microprocessor 306 is replaced by dedicated hardware.

The speed of the payload data bus 320 is at least as fast as the speed of the host interface 316, otherwise the data rate is reduced below the host capabilities. The speed of the bus at the media interface 401 between the media controller 301 and the associated storage media 311 need be only as fast as the storage media, because each media controller 301 buffers the data blocks at the dual-port memory 402 to allow the data bus a higher transfer rate. In this way, slower storage media are combined to give a higher overall transfer rate to the host, fulfilling the RAID 0 goal.

The host interface logic 310 provides a means through which the host begins a transaction and the means by which the data and subsequent status are communicated. Typical interfaces between a host and the storage system 300 use ATA, SCSI or FireWire protocols. The local microprocessor 306 is programmed for a given interface type to provide the correct protocols and control of the host interface logic 310. Some interface types require sub-microsecond response times on certain signals, which is beyond the capabilities of existing microprocessors, and so the host interface logic 310 includes hardware specifically designed for the application.

The media controller 301 comprises the parameter storage 404, a media interface circuit 406, the control data state machine 408, a command sequencer state machine 410, a media-side multi-mode transfer state machine 412, the dual-port memory 402, a memory controller 420, and the host-side transfer state machine 430. The host interface 316 to the media controller is one byte wide with multiple independent addresses; therefore, the media controller 301 advantageously appears to the local microprocessor as a simple peripheral. Use of the dual-port RAM as a buffer allows the simultaneous filling and draining (first in, first out) of the dual-port memory 402 to increase total system bandwidth. The internal data bus connections of the media controller 301 can be implemented with a completely different signal technology than the storage media 311 to which it is connected (TTL, LVTTL, LVD, ECL, or others). This allows for higher speed transmissions within and between the media controllers 301. This also allows for the transport of the signals over a greater distance with better noise immunity when forming arrays of large numbers of storage media. The media controller 301 is produced by programming a FPGA in a hardware description language such as VHDL or Verilog®. This advantageously allows the media controller 301 to be configured for different RAID operations without changing the hardware. This also advantageously allows the media controllers 301 to be easily updated to meet new specifications for storage media 311 without changing the hardware.

In a storage system 300 having three media controllers 301, preferably two FPGAs are used, one FPGA forms two of the media controllers 301, and the other FPGA forms the third media controller 301 and the host interface logic 310, for an ATA interface. In a storage system 300 having four media controllers 301 as shown in FIG. 4, preferably three FPGAs are used; one FPGA forms two of the media controllers 301, another FPGA forms the other two media controllers 301 and the third FPGA forms the host interface logic 310, for an ATA interface. In any event, the pathways of the media controller 301 and the multi-drop parallel buses 320, 322 and 324 of the storage system controller 302 are also formed from the FPGAs.

The plurality of finite state machines of the media controller 301 translate control information accepted from the control bus 324 of the storage system 300 into the sequence of READ and WRITE operations that are required to access the ATA storage media. The state machines accept four parameters of control information, and a single sequence control byte. The control information parameters are: a starting LBA number, a count of the number of blocks to transfer, an ATA "feature" byte, and an ATA command code. The sequence control byte indicates to the media controller 301 whether the ATA command requires a data transfer, and the direction (read or write), of that transfer. The transfer parameters are not limited to those explicitly accepted by the storage media 311, but extend the range of those parameters. For example, standard ATA storage media 311 accept a block count value of eight bits (a range of 1 to 256 blocks). The media controller 301 can accept 16 or more bits for this parameter, and can repeatedly re-command the storage media 311 until the entire request is satisfied.

The media controller 301 has a capability to accept commands at any time, even while the state machines are active or busy. This capability allows the host CPU or the local microprocessor 306 to interrupt the media controller 301 and either stop them or re-command a new operation. At any time, the host CPU or local microprocessor 306 may inquire of the current state of a data transfer. This allows the host CPU and local microprocessor 306 to manage time-out and abort functions.

All media controllers 301 are always connected, and listening, to the control bus 324. Each media controller 301 is assigned its own physical controller number, and this physical controller number is used to identify the media controller 301 and allows groups of media controllers 301 to be selected for transfers. All media controllers 301 listen for a bit field address match on the control bus 324 to receive commands or to start execution. Each media controller 301 with a bit match executes in true parallel. Because the media controllers 301 share a common control bus 324, the controller selection process is commanded in a single WRITE operation. As the command parameters are passed along the bus, media controllers 301 may be selected and deselected so that common parameters are passed to a plurality of media controllers 301 simultaneously, but individual parameters may also be passed to a media controller 301 individually.

The operation of the media controller 301 is governed by a number of parameters. The parameter values are established by the local microprocessor 306 (FIG. 3) during system configuration. All parameters take the form of a binary value, and are implemented with a certain number of bits that establishes the range and resolution of the parameter. Different implementations may employ different numbers of bits for any parameter. Each parameter is used by a specific state machine.

TABLE 1

| Application | Parameter | Number of bits |
|---|---|---|
| Command Sequencer | Data setup time | 4 |
| | Data enable time | 4 |
| | Data hold time | 4 |
| | Initial status timeout | 8 |
| | Command status timeout | 8 |
| Media-side Transfer Machine | PIO setup time | 5 |
| | PIO enable time | 4 |
| | PIO hold time | 4 |
| | Data status timeout | 8 |
| RAID Calculator | Total number of controllers | 3 |
| | This controller's sequence number | 3 |
| | Transfer block size (i.e., chunk size) | 6 |
| Host-side Transfer Machine | Next controller's physical number | 8 (bit field) |
| | Configure for RAID 1 operation | 1 (yes or no) |
| | Configure for storage media to storage media operation | 1 (yes or no) |
| Media Interface | Power ON/OFF selection | 1 |

The parameters of Table 1 are stored in registers of the parameter storage 404 within the media controller 301, and the values are updated by the local microprocessor 306 via the control data state machine 408.

The most important function of the media interface circuit 406 is the routing of media control signals and payload data to the dual-port memory 402, the command sequencer state machine 410 and the media-side multi-mode transfer state machine 412. The routing function is passive; meaning that the actual timing and sequencing is established by the command sequencer state machine 410 and the media-side multi-mode transfer state machine 412.

There is a physical interface at the media interface 401 between the media controller 301 and the storage media 311. The storage media 311 is driven directly by the FPGA with appropriate impedance matching, which prevents signals from overshoot and ringing. The output drivers in the FPGA have both slew rate and current drive adjustment capabilities to improve the electrical interface characteristics between the media controller 301 and the storage media 311. These features improve signal noise immunity and other characteristics that are important.

The storage media 311 is accessed using a series of individual READ and WRITE operations, similar to those found in the general microprocessor bus 330. The FPGA includes features for controlling the timing parameters of each operation cycle. Control and status cycles are controlled with a set of timing parameters separate from those used to control the data timing (the control and status registers are in logically different locations in the media memory), because these parameters are specified separately in the ATA specification. The data setup and hold portions of the cycle are separately adjustable, as are the address setup and hold durations.

The control data state machine 408 monitors the control bus 324 and updates the parametric and transaction information registers as values are passed from the local microprocessor 306. For each media controller 301, a physical controller number is established when the hardware is defined. The physical controller number maps to a specific bit on the control bus 324 when selection of a media controller 301 occurs. For example, media controller 0 is selected by bit 0, media controller 1 by bit 1, and so on.

Preferably, the control bus 324 consists of an 8-bit bi-directional bus for data and for control signals. Preferably, there are nine control signals: CS, ERROR, ADDRESS0, ADDRESS1, ADDRESS2, ADDRESS3, ADDRESS4, READ, and WRITE; however, the number of controls signals depends upon the microprocessor selected for use as the local microprocessor 306. The control bus is not limited to being an 8-bit bus and may alternatively be of another size. The CS signal qualifies all other control signals. While CS is FALSE, all other signals are ignored. The ERROR signal is a wire-OR signal that is asserted by any media controller 301 that detects an error. When asserted, the local microprocessor 306 stops any outstanding data operations and reports an error code to the host. The five address signals identify the specific parameter or register being addressed. Of the 32 possible locations, the media controller 301 responds only to addresses 0, 1, and 2 (that is, binary bit patterns '00000', '00001', '00010'); operations with other addresses are ignored. Control data is transferred when the local microprocessor 306 asserts the READ or WRITE signal while a valid combination is present on the address signals. The local microprocessor 306 sends data to the media controller 301 by asserting the WRITE signal, and the local microprocessor 306 receives data from the media controller 301 by asserting the READ signal. The data transferred is listed in FIG. 2, below, according to the address.

| Address | Write operation | Read operation |
|---|---|---|
| 00000 | 8-bit data to a register | 8-bit data results, or the least-significant 8 bits from operations that return more than 8 bits of data. |
| 00001 | Bit D1: when '1', media controller enters a reset state when '0', media controller is released from the reset state Bit D0: when '1', media controller accepts command data and parameters when changed from '1' to '0', media controller executes the command | The most significant bits from operations that return more than 8 bits of data. |
| 00010 | Select media controller(s) | BUSY and ERROR status |

A typical operation begins by selecting specific media controllers 301 using a WRITE operation at address 2. Each bit in the written byte corresponds to a specific media controller 301, and more than one media controller 301 may be selected simultaneously, which facilitates the simultaneous broadcast of information to many media controllers 301. Bit 0 selects media controller 0; bit 1 selects controller 1 , and so on. Media controllers 301 not selected (that is, those with a '0' in the corresponding selection bit), ignore all READ and WRITE operations to addresses 0 and 1, as well as READ operations at address 2 (BUSY status). All media controllers 301 always accept WRITE operations at address 2.

When reading data from the media controllers 301, it is important that only one be selected during the READ operation. Selecting more than one will produce a "bus contention" situation while READ is asserted, and the data may be corrupted. In the extreme, hardware might be damaged. Local microprocessor 306 firmware prevents multiply selected situations during a READ operation.

At system initialization and after errors have been processed, it is necessary to reset the media controller 301 to a known state. This is accomplished by selecting the necessary media controller(s), and writing address 1 with bit D1 asserted ('1') and writing again with bit D1 deasserted ('0').

Media controller 301 commands are delivered using many WRITE operations. After selecting one or more media controllers 301, bit 0 of address 1 is asserted (written to '1'). This prepares the media controller 301 to accept a command byte sequence written through address 0. The command byte sequence can vary in length depending on the command, and preferably uses a maximum of 12 bytes. Regardless of the length, the last byte written is the actual command byte, and the preceding bytes are parameters for the command. There are three basic commands: a Task File Transfer (TFT) command, a Task File Register (TFR) command, and a Configuration Register (CR) command.

The CR command causes the control data state machine 408 to transfer parametric information to or from the parameter storage 404 via a parametric information pathway 433. The TFR and TFT commands cause the control data state machine 408 to make transfers to and from the media task file registers included within each storage media 311, via an additional command information pathway 434. The media task file is the collection of registers used for commanding the storage media 311 and obtaining status information from the storage media. The media task file is located in registers (not shown) within the storage media 311 operably coupled to the media controller 301. To perform a data transfer between the storage media and the media controller 301 pursuant to a TFT command, the contents of seven registers from the media task file need be transferred into the storage media 311 from the media controller 301 prior to the occurrence of the data transfer. The TFT command also invokes the media-side multi-mode transfer state machine 412 to transfer data between the storage media 311 and dual-port memory 402 using the payload data bus 320. To perform a data transfer between the storage media 311 and the media controller 301 pursuant to a TFR command during error recovery, the contents of only one register from the media task file need be transferred between the storage media and the media controller 301. It is possible to issue a command code that causes none of these actions— that command is a "no operation" command and is used when the local microprocessor 306 is uncertain of the current state of the data sequence (e.g., subsequent to an unexpected reset).

After the entire command byte sequence has been written, bit 0 of address 1 is deasserted (written to '0') to cause the command to be executed. The last data byte written determines which command will be executed. Under some error conditions, the local microprocessor 306 may be uncertain of the state of the command byte sequence. A "safe" error recovery is accomplished by writing the no-operation code before deasserting bit 0. If too many bytes are written before the command is executed, the bytes not needed for the command are ignored.

When more than one media controller 301 are to receive the same data, it is desirable to select the more than one media controllers 301 as a group. Advantageously, this allows the local microprocessor 306 to transfer data and control operations to all the media controllers 301 of the group simultaneously, eliminating the need for sequentially-addressing each media controller 301 individually. In addition, the selection byte can be changed at any time during control data transfers. Consider the case where the control data consists of ten bytes, nine of which are identical for all media controllers 301 and the 10th is unique to each controller, and assume also that four media controllers 301 are present. To write to each sequentially requires forty-four WRITE operations (including a WRITE for each selection). Utilizing the multidrop feature of the invention reduces this to eighteen WRITE operations ("select all"+"9 data"+4 each "select one+1 data"), advantageously reducing the time required over prior art methods by over 50%. The use of additional media controllers 301 shows even greater advantage over the prior art.

While the command is in process (some commands take longer than others do), the status register (reading address 2) will indicate the busy condition. Specific bits within the status register indicate the progress of the command, but for practical purposes the media controller 301 is either busy or not. Reading from address 0 or address 1 while the media controller 301 is busy produces undefined results. If the media controller 301 is deselected while busy, command processing continues. The media controller 301 must again be selected before the local microprocessor 306 can ascertain the busy status.

The CR commands include a CR-read command and a CR-write command. The CR-read command requires one additional byte of control data (a register address), and the CR-write command requires two additional bytes of control data (a register address and the data to be written to that register). The CR-read command places the requisite data into the read buffer. After the command completes that is, when reading address 2 indicates "not busy", the local microprocessor 306 reads the data from address 0. Some registers contain more than eight bits of data, and the additional bits are presented in address 1.

The TFR commands are similar to the CR commands, but instead of accessing the parametric storage, the media task file is accessed. The TFR commands include a TFR-read command and a TFR-write command. An address and a data byte are supplied with the commands, and the results of read operations appear in the address 0 and the address 1 data registers. Reading from task file register 0 is a 16-bit operation, and reading from all other task file registers is 8-bit operation. Only 8-bits of data are allowed when using the TFR-write command. Using the TFR commands allows the local microprocessor 306 to invoke any desired media command and to obtain data from the storage media (although the data transfer is slow compared to the payload bus). The TFR commands are most commonly used during system initialization and error recovery operations.

The TFT commands are the most complex of all the commands of the media controller 301. In the preferred embodiment, these commands require seven additional bytes of information. In an alternative embodiment, these commands require thirteen additional bytes of information. The data bytes contain the values to be written to the seven media task file registers, allowing any of the basic ATA operations to be performed (8-bit sector count, 28-bit logical block address (LBA), 8-bit feature register, and 8-bit command register). Alternatively, the sector count is 32 bits, and the LBA is at least 48 bits, thereby increasing the number of bytes required to at least thirteen. The TFT commands include three commands: a TFT-read command, a TFT-write command, and a TFT-noData command. Command processing proceeds in five phases: 1) Initial status, wait for storage media to be ready; 2) Write to task file register; 3) Data status, wait for storage media to indicate data transfer request; 4) Data transfer; and 5) Write-complete status, wait for storage media to indicate data successfully written. The TFT-noData command uses only phases 1, 2, and 5. The TFT-read command uses phases 1, 2, 3 and 4, repeating phases 3 and 4 for every block transferred. The TFT-write command uses all five phases, repeating phases 3 and 4 for every block transferred. Any of the three status phases can realize a "time out" error if the storage media 311 does not indicate ready within a predetermined amount of time. The durations are independently established in the parameter data, and range from a few seconds to about 30 seconds. The data-status and write-complete status phases are terminated if the storage media 311 reports an error condition. In this case, the media controller 301 status byte (address 2) indicates the error and will no longer indicate busy. The local microprocessor 306 recognizes this condition and commences error-processing operations. The data transfers of phase 4 are handled by the media-side multi-mode transfer state machine 412 and the host-side transfer state machine 430.

The command sequencer state machine 410 correctly sequences the operational phases, asserts the media control signals (via the media interface circuit 406), provides the correct task file addressing signals, and recognizes media busy and error conditions. The command sequencer state machine 410 handles the processing for all TFR and TFT commands. Each READ or WRITE operation involving the media task file is governed by the data setup, enable, and hold timing parameters described hereinbefore. The values of these parameters ultimately establish a rate at which the media task file is accessed by the media controller 301. Different storage media (manufacturer and model) operate at different speeds, and so correct selection of the values is a trade-off between the storage media capabilities and a desire to make the transfers as fast as possible. When processing TFT commands, phase four operation requires the command sequencer state machine 410 to communicate with the media-side multi-mode transfer state machine 412. While the media-side multi-mode transfer state machine 412 is actively transferring data between the storage media 311 and dual-port memory 402, the command sequencer state machine 410 suspends operation and continues to report busy status. There is no timeout associated with this phase of operation.

If the extended count values of the alternative embodiment are implemented, the command sequencer state machine 410 repeats the 5-phase process as many times as necessary to fulfill the total required transfer size. This is desirable because current ATA storage media allow only an 8-bit count value in any given task file operation, and so can transfer no more than 256 blocks for any given command. The extended count feature is implemented when using, for example, a SCSI host interface. A single SCSI command can request as many as 4 billion blocks (a 32-bit value), far exceeding the capability of a single ATA storage media.

The media-side multi-mode transfer state machine 412 transfers data between the dual-port memory 402 and the media interface circuit 406. The ATA standard defines three different (and exclusive), signaling modes used for transferring data: PIO, multiword DMA, and ultra DMA. The direction of the data transfer (to or from the storage media 311) is specified by the current TFT command.

Regardless of the signaling mode, the media-side multi-mode transfer state machine 412 repeatedly transfers words of data (two bytes), between the media port 401 and dual-port memory 402. If the dual-port memory 402 is full while transferring from the storage media 311, the data transfer is suspended until a location is available in the dual-port memory. If the dual-port memory 402 is empty while transferring to the storage media 311, the data transfer is suspended until a value has been deposited in the dual-port memory by the host-side transfer state machine 430. Each operation involving the media data register is governed by the data setup, enable, and hold timing parameters described herein above. Two separate parameter sets are provided for PIO/multiword and ultra DMA modes of operation.

The dual-port memory 402 and the associated memory controller 420 are of conventional construction. Preferably, the dual-port memory 402 is implemented by use of a standard Xilinx block memory. Alternatively, a different dual-port memory implementation within the FPGA is used, or memory outside the FPGA is used. Inputs and outputs are defined according to the current data transfer direction. Preferably, the dual-port memory 402 incorporates 512 bytes of memory capacity in each media controller 301.

The scatter/gather process is implemented in what is equivalent to a distributed, scalable, state machine, including the host-side transfer state machine 430. The host-side transfer state machine 430 controls how and when data is transferred between the media controller 301 and the host interface logic 310 via a payload control and sequencing pathway 432 to the payload data bus 320. The host-side transfer state machine 430 establishes a maximum data rate for which the media controller 301 is capable. The data rate of the total storage system 300 is limited to the least of the data rate of the host-side transfer state machine 430, the data rate of the host interface 316, and the combined data rates of the plurality of storage media 311. The direction of the data transfer (to or from the host interface) is specified by the current TFT command.

The parameter item "next controller's physical number", establishes the data transfer order among the various media controllers 301. When a media controller 301 completes a portion of the transfer, the data request (data ready) signal is deasserted and the "next physical number" is broadcast to all media controllers 301 via the payload control and sequencing pathway 432 to the payload data bus 320. The controller with the physical number corresponding to the "next physical number" takes up the transfer process, asserts "data ready" and transfers data as described hereinbefore.

When transferring data to the host, the host-side transfer state machine 430 monitors the number of bytes stored in the dual-port memory 402. When 512 bytes are available, the machine waits for control of the payload data bus 320, and having obtained control, asserts the data request (data ready) signal and transfers data from the host interface logic 310. The payload data bus 320 includes a signaling technique to throttle the rate at which data transfers can occur according to the rate at which the host accepts the data.

When transferring data from the host, the host-side transfer state machine 430 monitors the number of empty storage locations in the dual-port memory 402. When 512 byte-locations are available, the machine waits for control of the payload data bus 320, and having obtained control, asserts the data request (data ready) signal and transfers data to the host interface logic 310. The payload data bus 320 includes a signaling technique to throttle the rate at which data transfers can occur according to the rate at which the host provides the data.

The mechanism used for switching from one media controller 301 to another is critical to achieving the best possible data transfer rate. A method in accordance with the invention is to provide each media controller 301 with a physical controller number of the media controller 301 used for the "next" transfer, causing the media controller 301 to announce the physical controller number, and then having each media controller 301 suspend data transfers until the correct physical controller number has been announced. The ordering is predetermined when the system is assembled and is immutable once determined. Whatever order is chosen for distributing data among the various storage media 311, that order must be observed when retrieving the data. Thus, the sequence is determined ahead of time and stored in each media controller 301 as a form of distributed memory, reducing overhead during the data transfer. When one media controller 301 completes a transfer, the next in line is enabled to perform its transfer. Each media controller 301 transfers one 512-byte block of data and then signals another controller to begin its transfer. Each media controller 301 is numbered (0, 1, 2, . . . ) with a physical controller number, and each media controller holds the physical controller number of the next-to-transfer media controller. After the 512-byte transfer, the media controller 301 that has just finished a transfer broadcasts, on the payload control and sequencing pathway 432, the number of the next-to-transfer media controller to all media controllers 301 present on the bus, and a specific control signal is asserted. The next media controller 301, when ready, assumes control of the payload data bus 320 and transfers another 512-byte block. The process is repeated until all media controllers 301 have transferred all their blocks. This is advantageous over a token-passing technique of the prior art, because with the invention the sequence is completely arbitrary and some media controllers 301 can be skipped if desired.

The sequence in accordance with the invention forms a closed ring so that every media controller 301 has a neighbor to enable. This form of handover allows the system to be fully scalable and flexible because any media controller 301 can be next after any other media controller 301. In fact, some media controllers 301 can be left out altogether (to cover defective storage media or hardware), or more than one ring of media controllers 301 can be created and multiple logical units can be formed. The minimum case is when each media controller 301 is neighbor to itself so all the data is transferred to a single storage media 311. Alternatively, another form of handover is wherein each media controller 301 is hardwired to its neighbor; thus determining which media controller 301 would be "next".

Normally, the storage system 300 in accordance with the invention provides a single logical unit to the host, in spite of being comprised of a plurality of media controllers 301. A reason to skip a media controller 301 is when the storage system 300 is divided into logical subsets in order to provide more than one logical unit to the host. For example, media controllers 0, 1, 2 and 3 may be grouped into one logical unit (Group I), and media controllers 4, 5, 6 and 7 may be grouped into another logical unit (Group II), so that the host can use these two groups as separate storage media. Other reasons to skip are when a media controller 301 becomes defective, or when a storage media 311 and a media controller are held in off-line reserve while replacing a defective storage media. The configuration of next-media indicators can be changed at any time by the local microprocessor 306, giving a high degree of flexibility in error recovery. In a token passing scheme, when a prior art controller has an inactive storage media, or for any other reason is unable to operate on a command, the prior art controller disadvantageously stills needs to receive and pass control.

The preferred embodiment of the invention realizes a scatter/gather hand over time of less than one microsecond. Thus, the method in accordance with the invention is a sequential deterministic control management technique for data flow to and from the host. This is different from disk array systems of the prior art, which disadvantageously require a host controller that decides which controller of a storage media is next to transfer. The prior art method constitutes localized control, as compared to distributed control of the storage system 300 in accordance with the invention. Furthermore, the prior art disadvantageously requires socket numbers, i.e., media numbers, to re-combine data packets. The data packets of the prior art storage systems arrive randomly, and, disadvantageously, an ID number is required within each data packet. Then, the data packets must be recombined in a proper order. On the other hand, the storage system 300 in accordance with the invention does not use ID numbers to re-combine data packets. Also, in the storage system 300 in accordance with the invention, there is no need to include ID numbers within the data packets because the data packets from the plurality of media controllers 301 arrive in proper sequence. There is a similar advantage with regard to data packets sent to the plurality of media controllers 301.

The word "transaction" means the method, at the storage system 300, of accepting a host data-transfer request (performed by the local microprocessor 306), addressing the appropriate storage media 311 (performed by one or more of the media controllers 301), transferring data (performed by one or more of the media controllers 301), and providing completion status to the host (performed by one or more of the media controllers 301 via the local microprocessor 306). In other words, each complete host access forms a transaction. For most transactions, the host computer provides the host logical block address (LBA) and host block count for transfer.

The word "multidrop" means the method and apparatus for distributing control and data information over a bus to many destinations, where all the receiving and transmitting storage media connect to the bus using identical signals.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

We claim:

1. In a storage system controller having a plurality of media controllers operably coupled to a multi-drop bus, each media controller pre-assigned a physical controller number, a method comprising the steps of:
   a) providing each media controller with a next physical controller number;
   b) causing one media controller of the plurality of media controllers to transfer data via the multi-drop bus;
   c) causing the one media controller to announce on the multi-drop bus the next physical controller number; and
   d) causing another media controller of the plurality of media controllers to transfer data via the multi-drop bus, wherein the pre-assigned physical controller number of the other media controller has a same value as the next physical controller number.

* * * * *